(12) United States Patent
Branson et al.

(10) Patent No.: US 7,849,164 B2
(45) Date of Patent: Dec. 7, 2010

(54) CONFIGURING A DEVICE IN A NETWORK VIA STEPS

(75) Inventors: Michael John Branson, Rochester, MN (US); Gregory Richard Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/621,608

(22) Filed: Jan. 10, 2007

(65) Prior Publication Data
US 2008/0168159 A1    Jul. 10, 2008

(51) Int. Cl.
*G06F 15/177*    (2006.01)
(52) U.S. Cl. .................. 709/220; 709/221; 709/222
(58) Field of Classification Search .................. 709/221
See application file for complete search history.

(56) References Cited

U.S. PATENT DOCUMENTS

| | | | | |
|---|---|---|---|---|
| 6,349,238 B1 * | 2/2002 | Gabbita et al. .............. 700/101 |
| 6,789,215 B1 * | 9/2004 | Rupp et al. .................... 714/38 |
| 2004/0218045 A1 * | 11/2004 | Bodnar et al. ............ 348/207.1 |
| 2005/0149375 A1 * | 7/2005 | Wefers .......................... 705/9 |

\* cited by examiner

*Primary Examiner*—Dohm Chankong
*Assistant Examiner*—Neeraj Utreja
(74) *Attorney, Agent, or Firm*—Owen J. Gamon

(57) ABSTRACT

A device, which is encoded with ordered steps, is connected to a network. In an embodiment, each of the steps includes a type, a link that points at a respective tool, and a completion condition. The steps are sent from the device to an address in the network. A selection of one of the links is received from a user who is associated with the type. In response, the user interface for the tool that is pointed at by the link is sent to the user. The user interface includes tool commands. In response to receiving a tool command from the user, the tool command is performed, and if the tool command causes the completion condition for its step to be met, a completion command for the step is sent to the address in the network. In this way, setup activities are coordinated for configuring a device in a network.

18 Claims, 11 Drawing Sheets

| ID | STEP DESCRIPTION | TOOL LINK | COMPLETION CONDITION | EXPERT TYPE | STEP COMPLETE | |
|---|---|---|---|---|---|---|
| 1 | CONFIGURE PARTITIONS | HTTP://WWW.../TOOL_A | PARTITIONS CONFIGURED | TYPE A | YES | 505 |
| 2 | INSTALL OS | HTTP://WWW.../TOOL_B | OS INSTALLED | TYPE B | NO | 510 |
| 3 | INSTALL APPLICATIONS | HTTP://WWW.../TOOL_C | APPLICATIONS INSTALLED | TYPE C | NO | 515 |
| 4 | TEST APPLICATIONS | HTTP://WWW.../TOOL_D | TESTCASES SUCCESSFUL | TYPE D | NO | 520 |

DEVICE STEPS FOR DEVICE A — 210

| | DEVICE STEPS FOR DEVICE A | | | | | 210 |
|---|---|---|---|---|---|---|
| | 525 | 530 | 535 | 540 | 545 | 550 |
| ID | STEP DESCRIPTION | TOOL LINK | COMPLETION CONDITION | EXPERT TYPE | STEP COMPLETE | |
| 1 | CONFIGURE PARTITIONS | HTTP://WWW.../TOOL_A | PARTITIONS CONFIGURED | TYPE A | YES | 505 |
| 2 | INSTALL OS | HTTP://WWW.../TOOL_B | OS INSTALLED | TYPE B | NO | 510 |
| 3 | INSTALL APPLICATIONS | HTTP://WWW.../TOOL_C | APPLICATIONS INSTALLED | TYPE C | NO | 515 |
| 4 | TEST APPLICATIONS | HTTP://WWW.../TOOL_D | TESTCASES SUCCESSFUL | TYPE D | NO | 520 |

FIG. 5

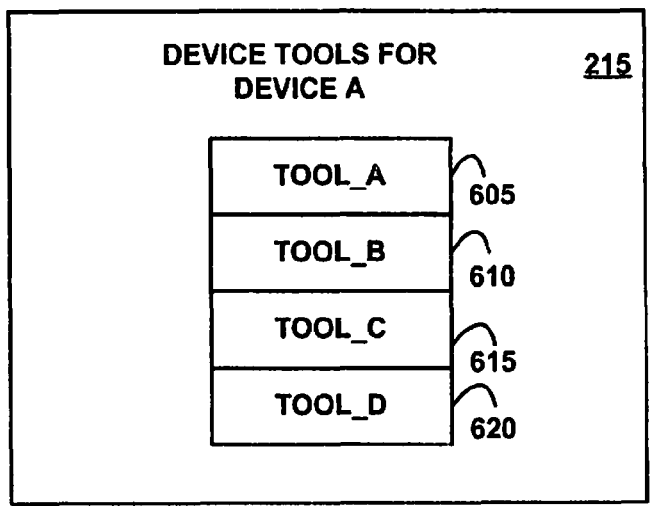

FIG. 6

POLICY STEPS FOR DEVICE A 158

| ID (525) | STEP DESCRIPTION (530) | TOOL LINK (535) | COMPLETION CONDITION (540) | EXPERT TYPE (545) | COMPLETE (550) |
|---|---|---|---|---|---|
| 2 | INSTALL OS | HTTP://WWW.../TOOL_G | OS INSTALLED | TYPE B | NO |

SERVER TOOLS FOR DEVICE A 154

TOOL_G 805

FIG. 8

EXPERT LIST 152

| EXPERT TYPE (925) | USERS (930) | |
|---|---|---|
| TYPE A | MIKE@..., GREG@... | 905 |
| TYPE B | MIKE@..., JANE@..., BOB@ | 910 |
| TYPE C | GREG@... | 915 |
| TYPE D | TOM@..., JANE@..., BOB@ | 920 |

FIG. 9

CONFIGURING A DEVICE IN A NETWORK VIA STEPS

FIELD

An embodiment of the invention generally relates to computer systems in a network and more specifically relates to coordinating the configuring of electronic devices in networks via steps.

BACKGROUND

Years ago, computer systems were stand-alone devices that did not communicate with each other. But today, computers are increasingly connected in networks and new devices are often added to the network, as the needs of users grow and change. Examples of these devices include servers, routers, clients, printers, storage devices, or other network-capable devices. When new devices are connected to a network, a variety of setup activities need to occur before the devices are ready for productive operation. These setup activities may include installing and testing various software programs and setting configuration parameters and data, not only at the new device but possibly at other pre-existing devices in the network as well. These setup activities often require one or more human experts to interact with the devices from one or more user interfaces in a defined order. These human experts often experience difficulty in coordinating their efforts. These difficulties can arise because the experts are not necessarily aware of each other, aware of the current state of the device, aware of the setup activities that have already been done, or aware of the setup activities that remain to be done, in order to prepare the device for productive use.

Thus, what is needed is a better technique for coordinating the setup activities performed by experts for installing a device in a network.

SUMMARY

A method, apparatus, system, and signal-bearing medium are provided. In an embodiment, a device, which is encoded with ordered steps, is connected to a network. In an embodiment, each of the steps includes a type, a link that points at a respective tool, and a completion condition. The steps are sent from the device to an address in the network. A user is selected who is associated with the type of a step, and the step is sent to the user. A selection of one of the links is received from the user. In response to the selection, a user interface for the tool that is pointed at by the link is sent to the user. The user interface includes tool commands. In response to receiving a tool command from the user, the tool command is performed, and if the tool command causes the completion condition for its step to be met, a completion command for the step is sent to the address in the network. In this way, setup activities are coordinated for configuring a device in a network.

BRIEF DESCRIPTION OF THE DRAWINGS

Various embodiments of the present invention are hereinafter described in conjunction with the appended drawings:

FIG. 5 depicts a block diagram of an example data structure for device steps, according to an embodiment of the invention.

FIG. 6 depicts a block diagram of an example data structure for device tools, according to an embodiment of the invention.

FIG. 7 depicts a block diagram of an example data structure for policy steps, according to an embodiment of the invention.

FIG. 8 depicts a block diagram of an example data structure for server tools, according to an embodiment of the invention.

FIG. 9 depicts a block diagram of an example data structure for an expert list, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a device is connected to a network. The device is encoded with ordered steps. Each of the steps includes a type, a link that points at a respective tool, and a completion condition. The device sends the steps to an address in the network. A setup coordinator at the address receives the steps. The setup coordinator selects an incomplete step in the order, selects a user that is associated with the type of the step, and sends the incomplete step to the user at a client. An application at the client displays the step via a user interface, which includes displaying the link and the completion condition. In response to the user selecting the link, the application retrieves the user interface at which the link points and displays the user interface. The user interface includes tool commands. In response to selection of a tool command by the user, the application sends the tool command and any associated data to the tool associated with the tool command. By selecting one or more tool commands, supplying data to one or more tool commands, and receiving data from the tool commands, the step is performed and completed by the tool commands. In response to completion of the step, the device sends a step complete command to the setup coordinator at the address in the network. The setup coordinator then selects the next incomplete step in the order, selects a user associated with its type, and the process repeats, until all of the steps are complete, at which time the configuration of the device in the network is complete. In this way, setup, installation, and/or configuration activities are coordinated for a device in a network.

Figure 1:
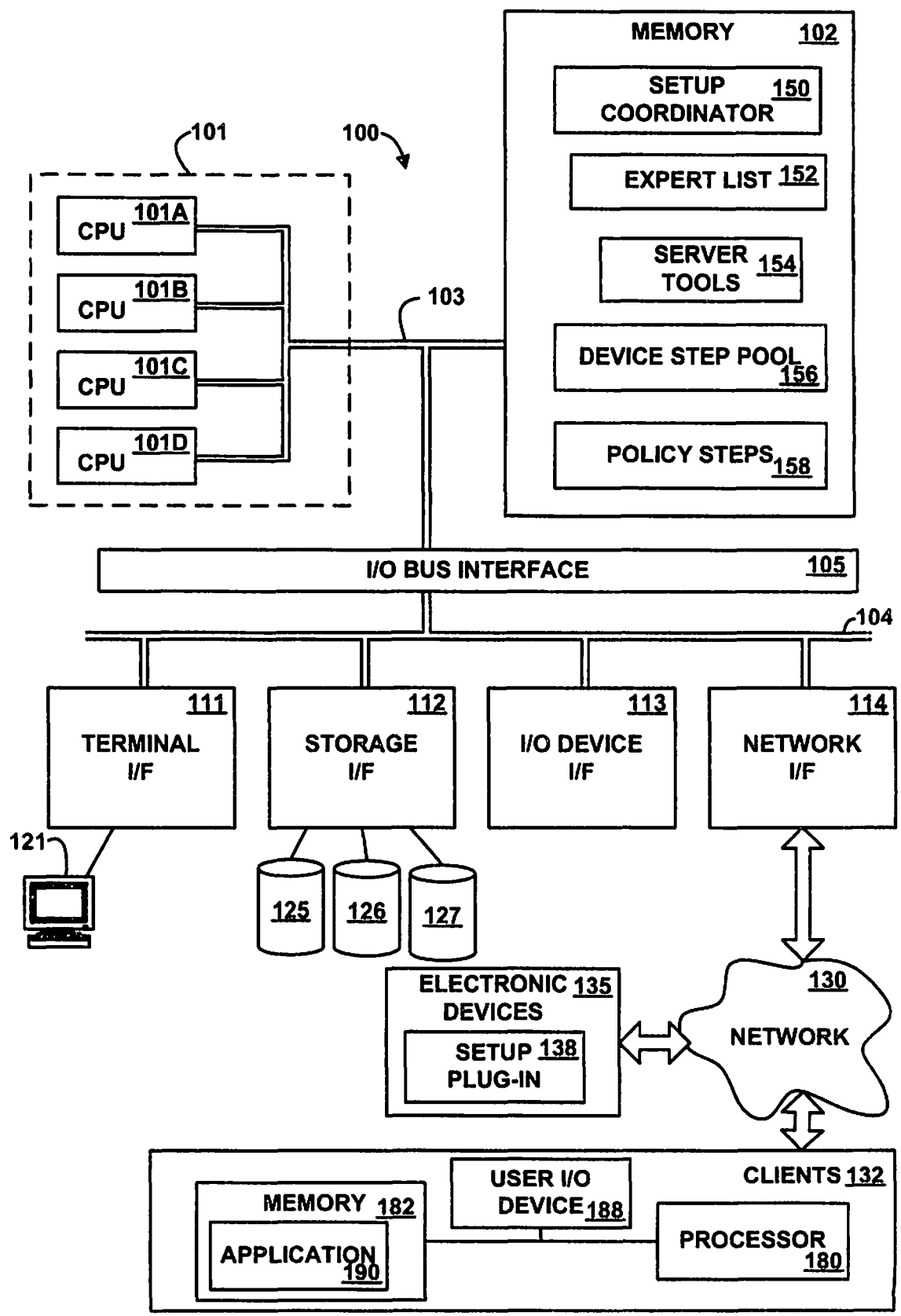
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to client computer systems 132 and electronic devices 135 via a network 130, according to an embodiment of the present invention. The terms "client" and "server" are labels that describe the various roles that the computer systems may assume and are included herein for convenience of exposition, only. In fact, in various embodiments, a particular computer system that acts in the role of a client or server in one scenario may act as another role in another scenario.

In an embodiment, the hardware components of the computer systems 100 and 132 and the electronic devices 135 may be implemented by an eServer iSeries computer system available from International Business Machines Corporation of Armonk, N.Y. However, those skilled in the art will appreciate that the mechanisms and apparatus of embodiments of the present invention apply equally to any appropriate computing system or device. Further, in various embodiments, the electronic devices 135 may be implemented via routers, printers, storage devices, or any other network-capable devices.

The major components of the server computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the server computer system 100, and may also include the virtual memory of other computer systems coupled to the server computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a setup coordinator 150, an expert list 152, server tools 154, a device step pool 156, and policy steps 158. Although the expert list 152, the server tools 154, the device step pool 156, and the policy steps 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the expert list 152, the server tools 154, the device step pool 156, and the policy steps 158 are illustrated as being contained within the main memory 102, these elements are not necessarily all completely contained in the same storage device at the same time. Further, although the expert list 152, the server tools 154, the device step pool 156, and the policy steps 158 are illustrated as being separate entities, in other embodiments some of them, portions of some of them, or all of them may be packaged together.

The expert list 152 describes users that cause steps to be performed by requesting tool commands. The server tools 154 specify tools that may be used to replace the tools specified by the electronic device 135. The device step pool 156 includes steps that the server computer system 100 receives from the electronic devices 135. The policy steps 158 specifies steps that may be used to replace the steps specified by the electronic device 135.

The setup coordinator 150 and the server tools 154 include instructions capable of executing on the processor 101 or statements capable of being interpreted by instructions executing on the processor 101 to perform the functions as further described below with reference to FIGS. 13, 14, 15, and 16. In another embodiment, the setup coordinator 150 and/or the server tools 154 may include logic gates or other hardware components in lieu of or in addition to a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121. The user terminal 121 may include a keyboard, video display terminal, speakers, a mouse or other pointing device, or any other input and/or output device via which a user can submit input and/or receive output to and/or from the computer system 100. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers, fax machines, or any other devices capable of transferring data. The network interface 114 provides one or more communications paths from the computer system 100 to other electronic devices 135 and client computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the server computer system 100, the client computer systems 132, and the electronic devices 135. In an embodiment, the network 130 is a private network and access is restricted to electronic devices 135 and clients 132 that are associated with a single individual, company, organization, agency, corporation, or group. In another embodiment, the network 130 is a public network that can be accessed by any compatible device.

In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The electronic device 135 may include some or all of the components as previously described above for the server computer system 100. The electronic device 135 further includes a setup plug-in 138, which sends steps to the server computer system 100. The steps facilitate the installation and/or configuration process of adding the electronic device 135 to the network 130 and preparing the electronic device 135 and other components (already connected to the network 130) to interact with each other. The electronic device 135 is further described below with reference to FIGS. 2 and 3.

The client computer systems 132 may include some or all of the components as previously described above for the server computer system 100. In particular, the client computer systems 132 include one or more processors 180 connected to memory 182 and a user I/O device 188. The memory 182 stores or encodes an application 190. The application 190 receives selected steps from the setup coordinator 150 and presents the steps via the user I/O device 188. A user at the client computer system 132 interacts with the steps via the user I/O device 188, in order to perform and complete the installation and/or configuration process that the steps describe. In various embodiments, the user I/O device 188 may be a terminal, a video display, a keyboard, a mouse or other pointing device, a speaker, a speech recognition device, any other I/O device, or any multiple or combination thereof. Although the client computer systems 132 are illustrated as being separate from the server computer system 100 and connected via the network 130, in another embodiment, some or all of the applications 190 may be implemented as a process that exists in the memory 102 and executes on the processor 101, with the steps displayed via the terminal 121.

It should be understood that FIG. 1 is intended to depict the representative major components of the computer systems 100 and 132, the electronic device 135, and the network 130 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer systems 100 and 132 and the electronic device 135, and that, when read and executed by one or more processors in the computer systems 100 and 132 and the electronic device 135, cause the computer systems 100 and 132 and the electronic device 135 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer systems 100 and 132 and the electronic device 135 via a variety of tangible signal-bearing media that may be operatively or communicatively connected (directly or indirectly)

to the processor or processors, such as the processors 101 and 180. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102 or 182, CD-RW, or diskette; or (3) information conveyed to the computer systems 100 and 132, and/or the electronic device 135 by a communications medium, such as through the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, electronic devices, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
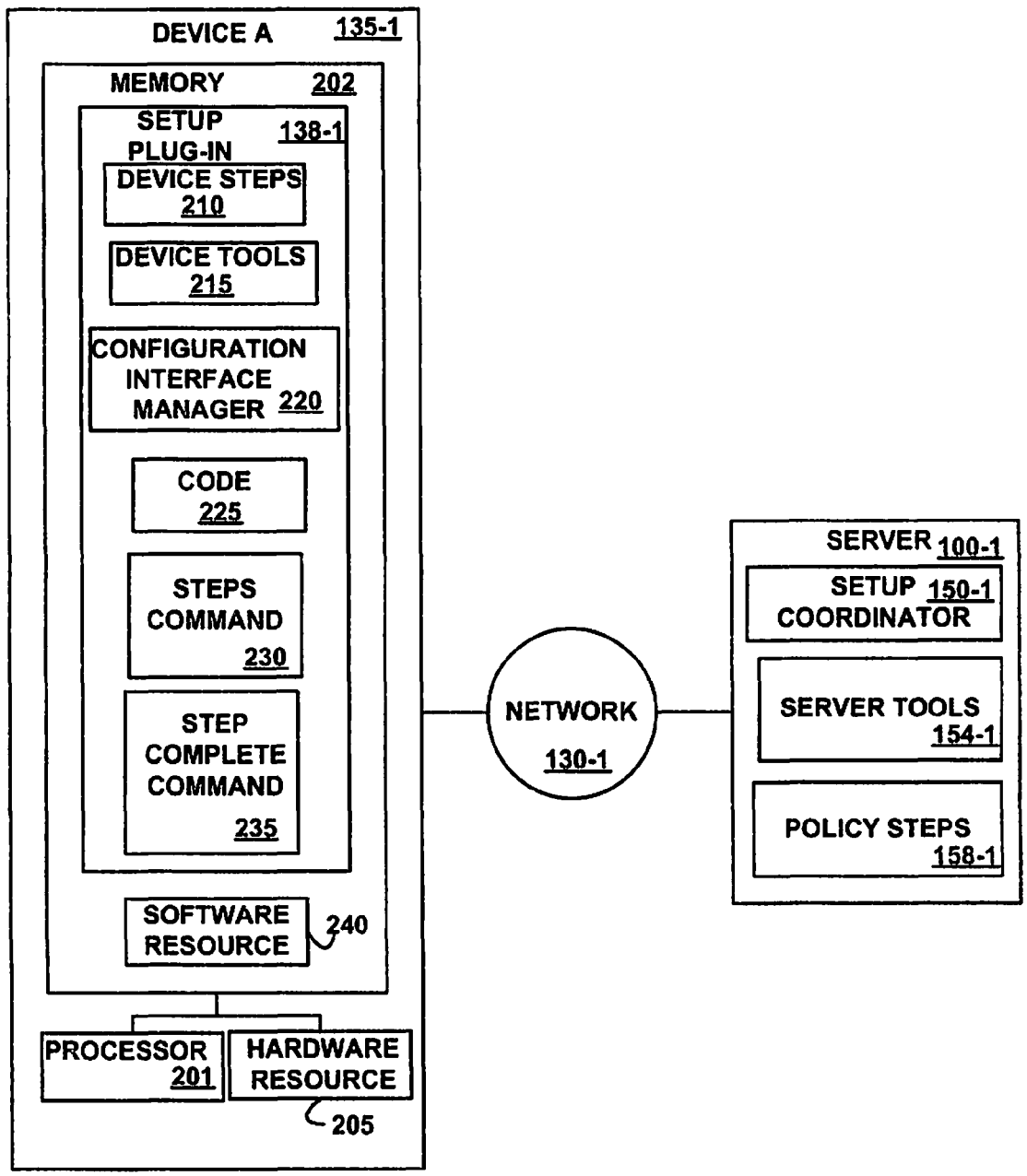
FIG. 2 depicts a high-level block diagram of selected elements of the example system, according to an embodiment of the invention.

FIG. 2 depicts a high-level block diagram of selected elements of the example system, according to an embodiment of the invention. The server computer system 100-1 is connected to the electronic device 135-1 via the network 130-1. The server computer system 100-1, the network 130-1, and the electronic device 135-1, are examples of, and are generically referred to by, the server computer system 100, the network 130, and the electronic device 135, respectively, as previously described above with reference to FIG. 1.

The electronic device 135-1 may include some or all of the components as previously described above for the server computer systems 100. In particular, the electronic device 135-1 includes one or more processors 201 connected to memory 202 and a hardware resource 205. The memory 202 stores or encodes a setup plug-in 138-1 and a software resource 240.

The setup plug-in 138-1 is an example of, and is generically referred to by, the setup plug-in 138 (FIG. 1). The setup plug-in 138-1 includes device steps 210, device tools 215, a configuration interface manager 220, code 225, a steps command 230, and a step complete command 235. The device steps 210 specify the ordered steps, processes, or actions needed in order to transition the electronic device 135-1 into a production mode. The steps facilitate the installation and/or configuration process of adding the electronic device 135-1 to the network 130-1 and preparing the electronic device 135-1 and other components (already connected to the network 130) to interact with each other. Each of the steps may specify a user interface and tool commands that may be issued to complete the step and a completion condition, which when satisfied causes the step to complete, allowing the next ordered step to occur.

The device tools 215 perform the tool commands. The configuration interface manager 220 coordinates modifying the device steps 210 and the device tools 215. The code 225 performs initial network set up that allows the electronic device 135-1 to communicate with the network 130-1. The code 225 sends the steps command 230, which includes or specifies the device steps 210, to an address or addresses on the network. The server computer system 100-1 is connected to the network 130-1 via the address or one of the addresses to which the steps command 230 is sent. The step complete command 235 sends an indication that a step has completed to an address or addresses on the network 130-1. The server computer system 100-1 is connected to the network 130-1 via the address or one of the addresses to which the step complete command 230 is sent.

In an embodiment, the device tools 215, the configuration interface manager 220, and/or the code 225 include instructions capable of executing on the processor 201 or statements capable of being interpreted by instructions executing on the processor 201 to perform the functions as further described below with reference to FIGS. 13, 14, 15, and 16. In an embodiment, the device tools 215, the configuration interface manager 220, and the code 225 may be implemented in hardware in lieu of or in addition to a processor-based system.

The hardware resource 205 and the software resource 240 represent hardware and software components, respectively, that may be modified or accessed by the device tools 215, as part of performing the steps. The hardware resource 205 may include logic and/or memory components. Examples of the hardware resources 205 include printers, storage devices, fax machines, copy machines, scanners, modems, I/O processors, terminals, adapters, and cards. Examples of software resources include operating systems, user interfaces, applications, third-party applications, code, programs, executable instructions, or interpretable statements. The hardware resources 205 and/or the software resource 240 may store, encode, or include data, such as configuration data, vital product data (VPD), or data that describes the hardware resource 205 or the software resource 240 to the electronic device 135-1, or any other component. The data may include serial numbers, specifications of models, types, or classes to which resources belong, storage capacities, performance capabilities, supported interface protocols, or error recovery information.

The server computer system 100-1 includes the setup coordinator 150-1, the server tools 154-1, and the policy steps 158-1. The setup coordinator 150-1 is an example of the setup coordinator 150, the server tools 154-1 are examples of the server tools 154, and the policy steps 158-1 are examples of the policy steps 158 (FIG. 1). The setup coordinator 150-1 connects to the configuration interface manager 220 in the electronic device 135-1 and sends the server tools 154-1 and/or the policy steps 158-1 to the configuration interface manager 220. The configuration interface manager 220 receives the server tools 154-1 and/or the policy steps 158-1 from the setup coordinator 150-1 and adds the policy steps 158-1 to the device steps 210 and/or replaces the device steps 210 with the policy steps 158-1. The configuration interface manager 220 further adds the server tools 154-1 to the device tools 215 and/or replaces existing device tools 215 with the server tools 154-1. In this way, the server computer system 100-1 may modify the device steps 210 and/or the device tools 215 in the electronic device 135-1 prior to the steps being performed. The server computer system 100-1 may further send a network address or addresses or a specification of all network addresses to the configuration interface manager 220, which stores the network addresses and uses them when sending future commands to the network 130. In this way, the server computer system 100-1 may modify or select the network address to which the electronic device 135-1 sends the steps command 230 and the step complete command 235.

In various embodiments, the server computer system 100-1 may be associated with or provided by a manufacturer, distributor, seller, of the electronic device 135-1. In various embodiments, the server computer system 100-1 may be associated with or provided by a business partner of the manufacturer, distributor, or seller of the electronic device 135-1. For example, a seller of the electronic device 135-1 may use the server computer system 100-1 to modify the device steps 210, in order to customize the device steps 210 to meet the unique requirements of the network 130 of a particular customer prior to installing the electronic device 135-1 in the customer's network 130. In another embodiment, the server computer system 100-1 may be associated with a user of the electronic device 135-1.

Figure 3:
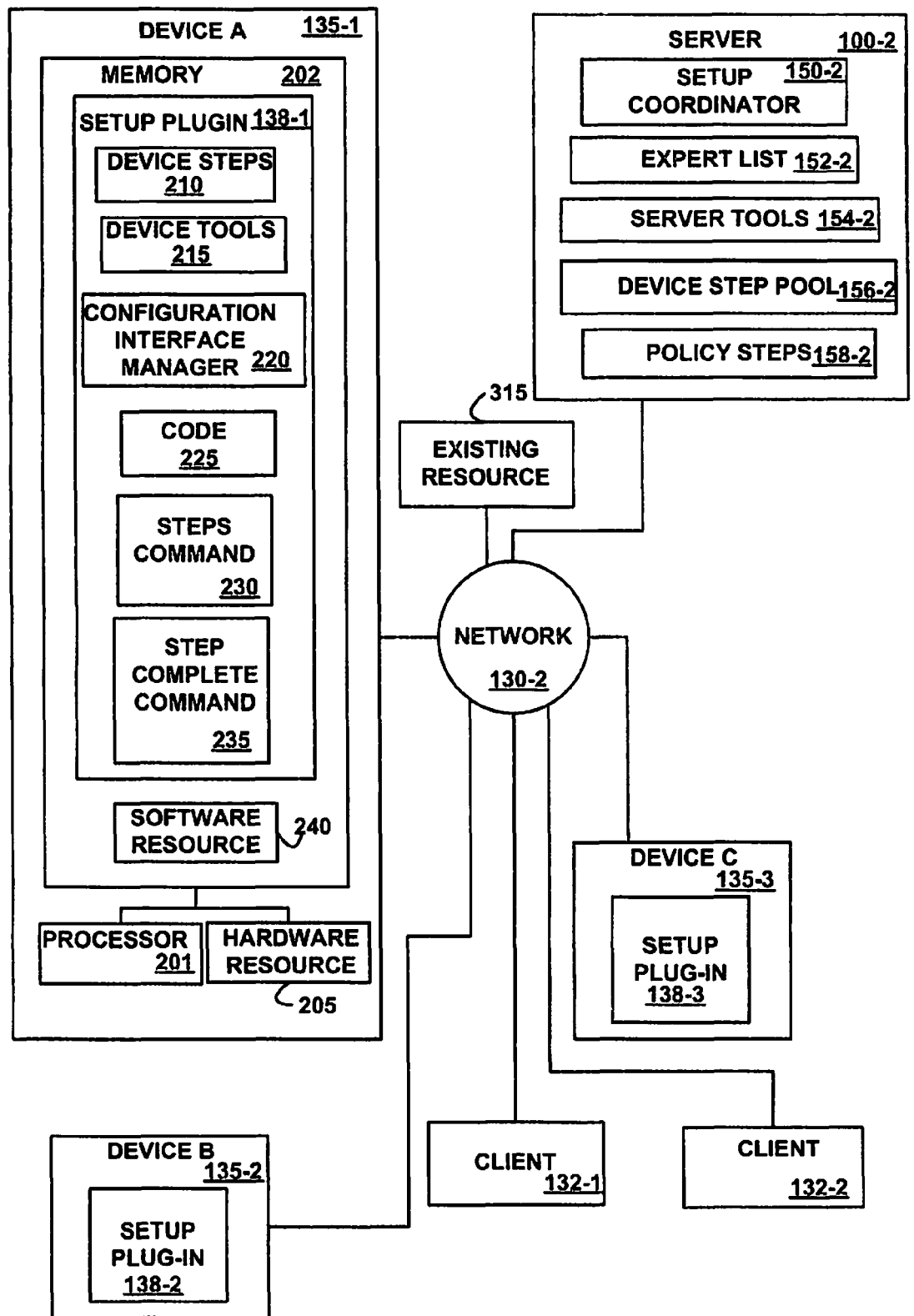
FIG. 3 depicts a high-level block diagram of further selected elements of the example system, according to an embodiment of the invention.

FIG. 3 depicts a high-level block diagram of further selected elements of the example system, according to an embodiment of the invention. The server computer system 100-2 is connected to the electronic device 135-1 via the network 130-2. The network 130-2 is further connected to the electronic devices 135-2 and 135-3, the client computer systems 132-1 and 132-2, and an existing resource 315. The server computer system 100-2, the network 130-2, the client computer systems 132-1 and 132-2, and the electronic devices 135-1, 135-2, and 135-3 are examples of, and are generically referred to by, the server computer system 100, the network 130, the client computer system 132, and the electronic device 135, respectively, as previously described above with reference to FIG. 1. The server computer system 100-2 may be the same or different from the server computer system 100-1. The network 130-2 may be the same or different from the network 130-1.

The electronic device 135-1 may include some or all of the components as previously described above for the server computer systems 100. In particular, the electronic device 135-1 includes one or more processors 201 connected to memory 202 and a hardware resource 205. The memory 202 stores or encodes a setup plug-in 138-1 and a software resource 240.

The setup plug-in 138-1 is an example of, and is generically referred to by, the setup plug-in 138 (FIG. 1). The setup plug-in 138-1 includes device steps 210, device tools 215, a configuration interface manager 220, code 225, a steps command 230, and a complete command 235. The device steps 210 may have been modified, as previously described above with reference to FIG. 2, or may be unmodified from the initial state. The device tools 215 perform the tool commands. The configuration interface manager 220 coordinates modifying the device steps 210 and the device tools 215. The code 225 performs initial network set up that allows the electronic device 135-1 to communicate with the network 130-2. The steps command 230 sends the device steps 210 to an address or addresses on the network 130-2. The step complete command 235 sends an indication that a step has completed to an address or addresses on the network 130-2.

In an embodiment, the device tools 215, the configuration interface manager 220, and/or the code 225 include instructions capable of executing on the processor 201 or statements capable of being interpreted by instructions executing on the processor 201 to perform the functions as further described below with reference to FIGS. 13, 14, 15, and 16. In an embodiment, the device tools 215, the configuration interface manager 220, and the code 225 may be implemented in hardware in lieu of or in addition to a processor-based system. The hardware resource 205 and the software resource 240 represent respective hardware and software components that may be modified or accessed by the device tools 215, as part of performing the steps.

The server computer system 100-2 includes the setup coordinator 150-2, the expert list 152-2, the server tools 154-2, the device step pool 156-2, and the policy steps 158-2. The setup coordinator 150-2 is an example of the setup coordinator 150, the expert list 152-2 is an example of the expert list 152, the server tools 154-2 are an example of the server tools 154, the device step pool 156-2 is an example of the device that pool 156, and the policy steps 158-2 are an example of the policy steps 158 (FIG. 1).

The setup coordinator 150-2 receives the device steps 210 from the electronic device 135-1 and adds the device steps 210 to the device pool 156-2. The setup coordinator 150-2 further optionally modifies the received device steps in the device step pool 156-2 with the policy steps 158-2, which may point at the server tools 154-2 in place of the device tools 215. The setup coordinator 150-2 further selects users from the expert list 152-2 for the steps in the device step pool 156-2 and sends the steps to the selected users, who may access user interfaces created by operation of the applications 190 and the device tools 215 or the server tools 154-2 at the client computer systems 132-1 or 132-2.

The electronic devices 135-2 and 135-3 may include some or all of the components as previously described above for the electronic device 135-1. In particular, the electronic devices 135-2 and 135-3 include respective setup plug-ins 138-2 and 138-3, which are generically referred to by the setup plug-in 138 (FIG. 1). The setup plug-in 138-1, the setup plug-in 138-2, and the setup plug-in 138-3 may have different versions of the device steps 210 and/or the device tools 215 that are customized for the needs of the particular electronic device 135 in which the device steps are stored.

In an embodiment, the existing resource 315 is an example of an electronic device 135 whose steps have been completed, so that the existing resource 315 is installed and configured into the network 130-2 and capable of interacting with selected other devices attached to the network 130-2. In another embodiment, the existing resource 315 is an electronic device, a server computer system, or a client computer system, which is configured to interact with the electronic device 135-1, by operation of commands selected by the user at the client computer system 132-1 or 132-2. Those commands are performed by the device tools 215 or the server tools 154-2, in furtherance of completion of the steps in the device step pool 156-2. The steps in the device step pool 156-2 were received from the device steps 210 and were optionally added to or modified by the policy steps 158-2.

Figure 4:
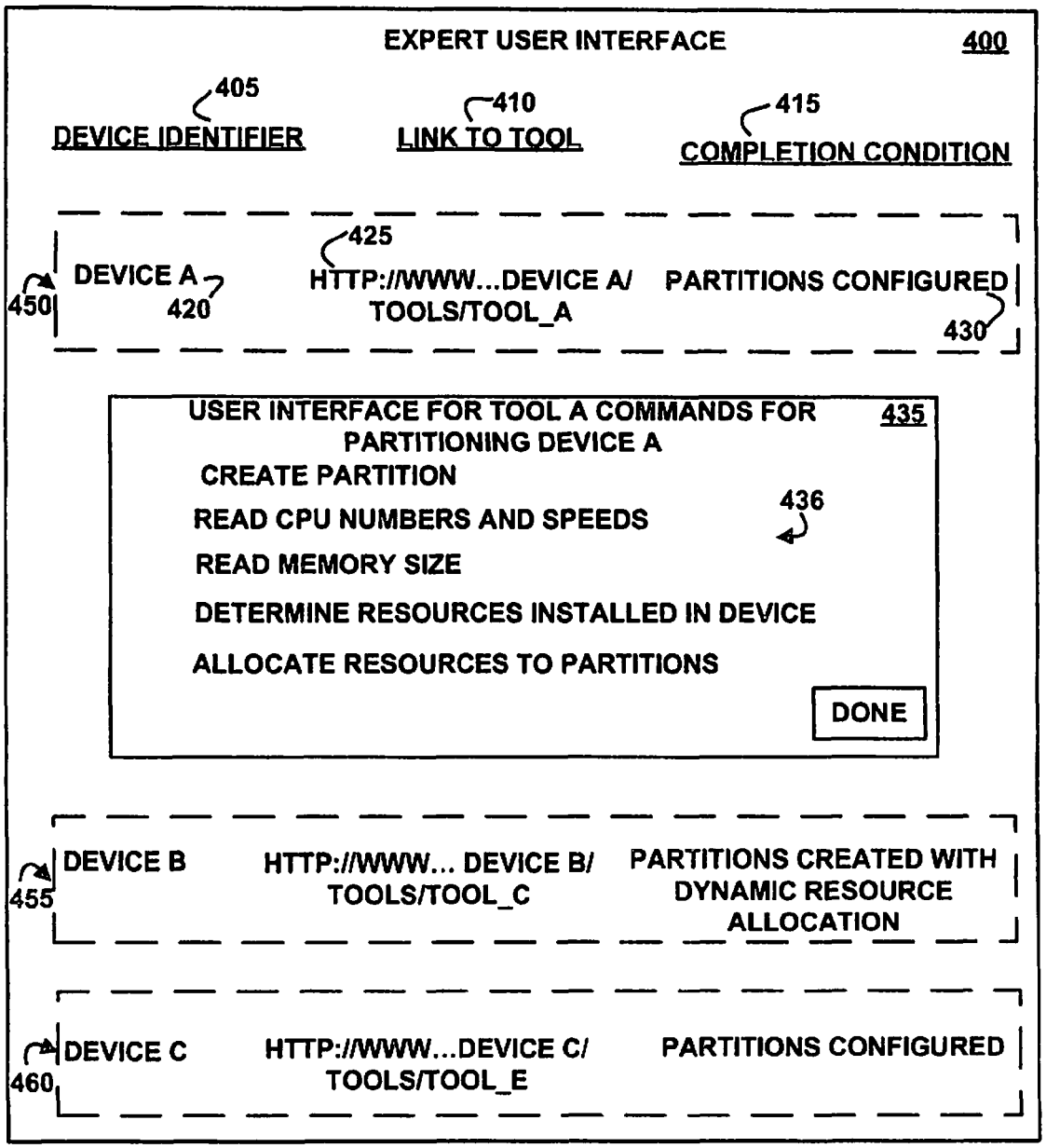
FIG. 4 depicts a block diagram of a user interface, according to an embodiment of the invention.

FIG. 4 depicts a block diagram of an example user interface 400, according to an embodiment of the invention. The application 190 displays the user interface 400 on the user I/O device 188 at the client computer system 132.

The example user interface 400 includes a display of steps 450, 455, and 460. A user, who is specified in the expert list 152, interacts with the user interface 400 in order to facilitate the performance and the completion of the steps 450, 455, and 460. The user interface 400 may receive and display additional steps at any time, and as steps are completed, the application 190 removes the completed steps from the user interface 400.

Each of the steps 450, 455, and 460 includes a displayed device identifier 405, a link 410, and a completion condition 415. The application 190 receives the steps 450, 455, and 460 for various electronic devices 135 (identified by the device identifier 405) from the setup coordinator 150 and, in response, displays the respective steps 450, 455, and 460, including the device identifier 405, the link 410, and the completion condition 415.

The device identifier 405 identifies the electronic device 135 to which the respective step applies. For example, for the step 450, the link 410 (the device identifier 405) specifies the electronic device name 420, which identifies the electronic device 135-1; for the step 455, the link 410 specifies the electronic device 135-2; and for the step 455, the link 410 specifies the electronic device 135-3.

As illustrated in FIG. 4, the device identifier 405 may identify different electronic devices 135, indicating that the steps 450, 455, and 460 are associated with different electronic devices, so that the user who interacts with the example user interface 400 is facilitating the completion of steps for the configuration of a variety of different electronic devices 135-1, 135-2, and 135-3. The electronic devices 135 identified by the device identifier 405 may be of the same or of different types. For example, the device identifiers 405 in the steps 450, 455, 460 may identify electronic devices 135 that are disk drivers, routers, server computer systems, client computer systems, printers, fax machines, copy machines, any other type of electronic device, or any combination thereof. In another embodiment, all of the device identifiers 405 in the user interface 400 specify electronic devices 135 that have the same type (e.g., all servers or all printers), and electronic devices of different types are associated with different user interfaces.

The link 410 points at, or specifies, a tool, such as one of the device tools 215 or one of the server tools 154 and optionally a file, method, or procedure within the tool. For example, for the step 450, the link 410 identifies the network address or link 425, which may specify a network protocol, domain, directory, subdirectories, and filename (within the directory or subdirectories) of the tool that corresponds to and provides commands that process the step 450.

The completion condition 415 specifies the condition or criteria that must be met in order for the respective step to be completed, the completion of which allows the next step (in the order) for the respective device to be performed. For example, the completion condition 430 in the step 450 specifies the condition that the partitions must be configured in order for the step to be complete. All of the completion conditions 415 in the steps 450, 455, and 460 are related to partitions, indicating that the electronic devices supports partitions and/or the tool command identified by the link 410 performs processing that creates, installs, sets up, or is otherwise related to partitions. But, in other embodiments, the processing for the tool commands (identified by the link 410) and the completion condition 415 may be related to other activities, such as installing and configuring operating systems, installing and configuring applications, executing test cases, and/or identifying the electronic device and/or its software or hardware resources to existing resources, clients, or services attached to the network 130.

In response to selection of the link 425, the application 190 retrieves the file specified by the link 425 from the electronic device 135-1 identified by the device name 420 and executes or renders the retrieved file, which displays the tool interface 435, including the various tool commands 436, which the user may select or invoke, in order to perform and complete the step. In response to selection of the tool commands 436, the user may submit data to the tool command, which causes the tool command to retrieve and display data from the software resource 240, retrieve and display data from the hardware resource 205, write data to the software resource 240 and/or the hardware resource 205, retrieve and display data from the existing resource 315, and/or send data to the existing resource 315.

FIG. 5 depicts a block diagram of an example data structure for device steps 210, according to an embodiment of the invention. The device steps 210 includes steps 505, 510, 515, and 520, each of which includes an order identifier field 525, a step description field 530, a tool link field 535, a completion condition field 540, an expert type field 545, and a step complete field 550. The order identifier field 525 specifies the order of the respective step, as compared to the other steps in the device steps 210. For example, the step 505 is first in the order of the steps; the step 510 is second in the order of the steps, the step 515 is third in the order of the steps; and the step 520 is fourth in the order of the steps. The step description field 530 specifies a text description of the step.

The tool link field 535 points at, or includes the address of, the device tool 215 that provides tool commands for the step. In the example record 505, the tool link field 535 specifies the example value of "http://www . . . /tool_A," which is displayed in the user interface 400 as the link value 425 in the link 410 in the step 450.

The completion condition field 540 specifies the condition or criteria that must be met in order for the step to be complete, so that the next step (in the order specified by the order identifier field 525) may be performed. In the example record 505, the completion condition field 540 specifies the example value of "partitions configured," which is displayed in the value 430 for the completion condition 415 in the step 450. After the completion condition 540 in the step 505 is met, the step 510 is performed because the step 510 is the next step following the step 505 in the order 525. After the completion condition 540 in the step 510 is met, the step 515 is performed because the step 515 is the next step following the step 510 in the order 525. After the completion condition 540 in the step 515 is met, the step 520 is performed because the step 520 is the next step following the step 515, as specified by the order 525. After the completion condition 540 in the step 520 is met, the steps 505, 510, 515, and 520 are all complete, so the configuring of the electronic device 135-1 for productive use in the network 130 is complete.

The expert type field 545 specifies the type or category of users that are capable of interacting with the tool commands provided by the tool specified by the tool link 535, or the expert type field 545 specifies the skills or knowledge that users must have in order to interact to the tool commands provided by the tool specified by the tool link 535. The step complete field 550 indicates whether or not the respective step has been completed.

Thus, each of the steps 505, 510, 515, and 520 represents a step or stage in an installation or configuration process for an electronic device 135, those steps have an order, those steps may be performed or processed by the respective linked tools in furtherance of completion of the steps, and a user who belongs to an expert type category selects the commands from an interface provided by the linked tools. For example, the step represented by the record 505 corresponds to the step 450 in FIG. 4. Thus, the setup coordinator 150 sends the step 505 to a user having an expert type 545 of "type A." The application 190 at the client computer system 132 (where that user is located) receives the step 505 and displays the step 505 on the user interface 400 as the displayed step 450 with the value from the tool link field 535 displayed as the link 425 and the value from the completion condition field 540 displayed as the completion condition 430.

FIG. 6 depicts a block diagram of an example data structure for the device tools 215, according to an embodiment of the invention. The example device tools 215 include the tools 605, 610, 615, and 620, which are pointed at by the tool links 535, in the respective steps 505, 510, 515, and 520, as previously described above with reference to FIG. 5. Each of the tools 605, 610, 615, and 620 includes executable instructions or interpretable statements that, when executed on the processor 201 or 101, perform the tool commands associated with the respective steps 505, 510, 515, and 520, in response to a request from an expert user. The tool commands associated with the step 505 that are provided by the tool 605 are illustrated in FIG. 4 as the tool commands 436.

FIG. 7 depicts a block diagram of an example data structure for the policy steps 158, according to an embodiment of the invention. The example policy steps 158 include a policy step 705, which includes an order identifier field 525, a step description field 530, a tool link field 535, a completion condition 540, an expert type field 545, and a step complete field 550, corresponding to the same fields in the device steps 210 (FIG. 5). The setup coordinator 150 may choose to replace the record 510 in the device steps 210 with the record 705 in the policy steps 158. In another embodiment, the policy steps 158 may include records that the setup coordinator 150 may choose to add to the device steps 210. Some or all of the values in the record 705 may be different from the corresponding values in an existing record in the device steps 210. For example, in the record 705, the value in the tool link field 535 is different from the value in the tool link field 535 in the record 510. Thus, if the setup coordinator 150 chooses to replace the record 510 in the device steps 210 with the record 705, the setup coordinator 150 is changing the tool that processes the tool commands that perform the installation of the operating system.

FIG. 8 depicts a block diagram of an example data structure for server tools 154, according to an embodiment of the invention. The server tools 154 specify the tools 805 that the setup coordinator 150 may use in addition to or in replace of the device tools 215. The setup coordinator 150 causes the server tools 154 to be used by adding or replacing the tool link 535, so that the tool link 535 in the step points at the server tool 154. For example, the tool link field 535 in the record 705 of FIG. 7 points at the tool 805 in the server tools 154.

FIG. 9 depicts a block diagram of an example data structure for the expert list 152, according to an embodiment of the invention. The expert list 152 includes records 905, 910, 915, and 920, each of which includes an expert type field 925 and a users field 930. The expert type field 925 specifies a type, category, skill set, or knowledge set that a user needs in order to interact with the tool commands that perform a step for an electronic device 135. The users field 930 specifies user identifiers, user e-mail addresses, or client applications that meet, satisfy, or belong to the expert type 925.

In an embodiment, a user may be assigned to more than one expert type 925. For example, the user "Mike" is assigned to both the expert type 925 of "type A" (in the record 905) and to the expert type 925 of "type B" (in the record 910), indicating that the user "Mike" is eligible to receive steps whose expert type 545 is both "type A" and "type B" (e.g., the records 505 and 510 in the device steps 210 and the record 705 in the policy steps 158). Thus, the user interface 400 that is accessed by a particular expert user may include steps that are assigned to a variety of different expert types 925 if that expert user is assigned to a variety of different expert types 925.

In an embodiment, a value for an expert types 925 may be unique to an electronic device or unique to a type of an electronic device. For example, the value "type A" may be assigned to only an electronic device having a type of a server computer system of a specified model that is manufactured by a particular company. In this way, the expert user who interfaces with the user interface 400 for the step having an expert type 545 that matches the expert type 925 in the expert list may be an expert user who has specialized knowledge about that particular electronic device.

In another embodiment, a value for an expert type 925 may be unique to a particular function. For example, the value "type A" may be assigned to experts who are knowledgeable about configuring partitions, and the user who is assigned to "type A" is capable of handling any type of electronic device (whether a server, disk drive or other electronic device).

In another embodiment, a value for an expert type 925 may be unique to both functions and types of electronic devices. For example, the value "type A" may be assigned to expert users who are knowledgeable about configuring partitions for server computer systems, and the user who is assigned to "type A" may only be expected to handle a step related to configuring a partition in a server computer system (or a server computer system with a particular model number).

Figure 10:
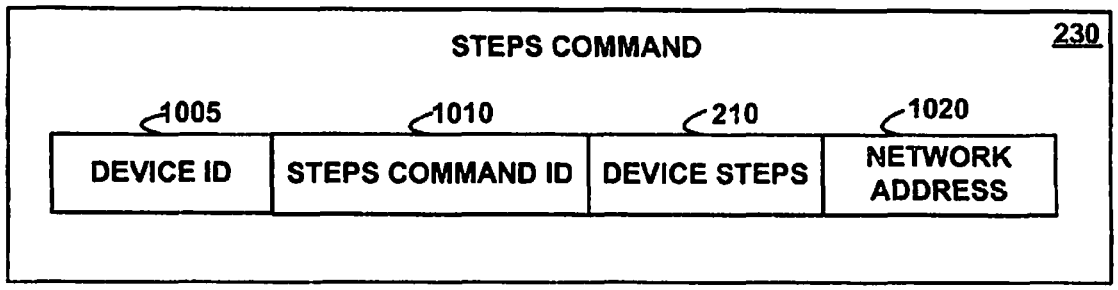
FIG. 10 depicts a block diagram of an example data structure for a steps command, according to an embodiment of the invention.

FIG. 10 depicts a block diagram of an example data structure for the steps command 230, according to an embodiment of the invention. The example steps command includes a device identifier field 1005, a steps command identifier field 1010, the device steps field 210, and a network address field 1020. The device identifier field 1005 identifies the electronic device 135 that sent the command. The steps command identifier field 1010 identifies the command as a steps command. The device steps field 210 specifies the steps for the electronic device 135, as previously described above with reference to FIG. 5. The network address field 1020 in the steps command 230 specifies the addresses on the network 130 to which the steps command 230 is sent. In various embodiments, the network address field 1020 may specify a broadcast command (all network addresses are to receive the steps command 230), may specify a single network address, or may specify a group of network addresses.

Figure 11:
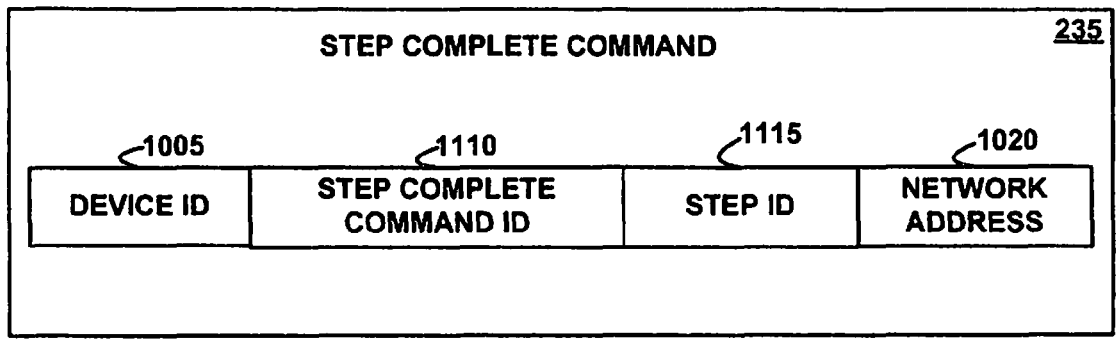
FIG. 11 depicts a block diagram of an example data structure for a step complete command, according to an embodiment of the invention.

FIG. 11 depicts a block diagram of an example data structure for the step complete command 235, according to an embodiment of the invention. The example step complete command includes a device identifier field 1005, a step complete command identifier field 1110, a step identifier field 1115, and a network address field 1020. The device identifier field 1005 identifies the electronic device 135 that sent the command. The step complete command field 1110 identifies the command as a step complete command. The step identifier field 1115 identifies the particular step within the steps 210 that is now complete. The network address field 1020 in the step complete command 235 specifies the addresses on the network 130 to which the step complete command 250 is sent. In various embodiments, the network address field 1020 may specify a broadcast command (all network addresses are to receive the step complete command 235), may specify a single network address, or may specify a group of network addresses.

Figure 12:
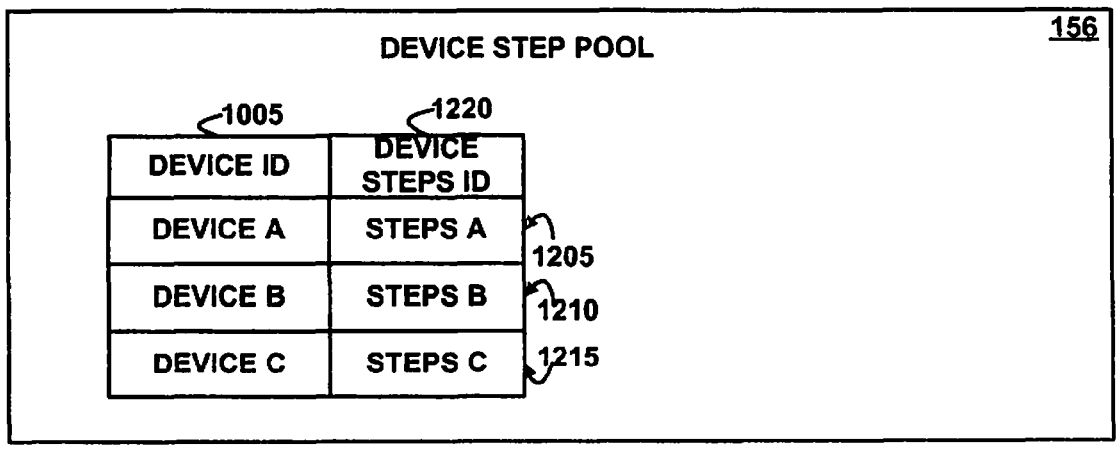
FIG. 12 depicts a block diagram of an example data structure for a device step pool, according to an embodiment of the invention.

FIG. 12 depicts a block diagram of an example data structure for the device step pool 156, according to an embodiment of the invention. The device step pool 156 includes example records 1205, 1210, and 1215, each of which includes a device identifier field 1005 and a device steps identifier field 1220. The device identifier field 1005 identifies the electronic device 135 associated with the respective steps 1220. The device steps identifier field 1220 identifies the steps 210 that are associated with the device 1005. For example, as specified by the record 1205, the electronic device 135-1 has the associated steps 210 illustrated in FIG. 5.

Figure 13:
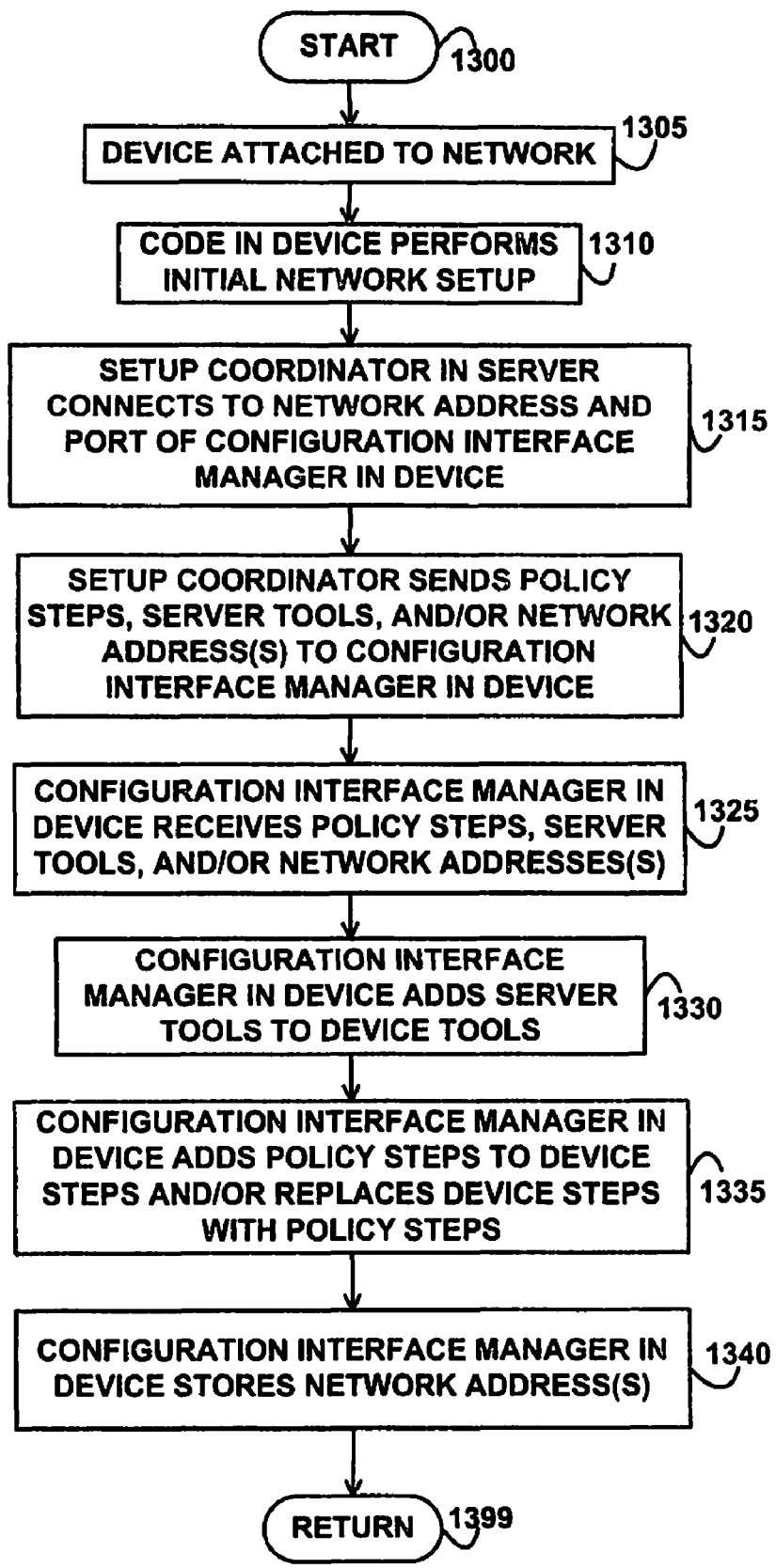
FIG. 13 depicts a flowchart of example processing for modifying device tools and device steps, according to an embodiment of the invention.

FIG. 13 depicts a flowchart of example processing for modifying the device steps and/or the device tools, according to an embodiment of the invention. Control begins at block 1300. Control then continues to block 1305 where the electronic device 135-1 is attached or connected to the network 130-1. Control then continues to block 1310 where the code 225 in the electronic device 135-1 performs initial network set up, so that the electronic device 135-1 can communicate to the network 130-1. Control then continues to block 1315 where the setup coordinator 150-1 in the server computer system 100-1 connects to the network address of the electronic device 135-1 and the port of the configuration interface manager 220 within the electronic device 135-1. Control then continues to block 1320 where the setup coordinator 150-1 sends the policy steps 158-1, the server tools 154-1, and/or a specification of a network address or network addresses to the configuration interface manager 220 in the electronic device 135-1. Control then continues to block 1325 where the configuration interface manager 220 in the electronic device 135-1 receives the policy steps 158-1, the server tools 154-1, and/or a specification of a network address or network addresses.

Control then continues to block 1330 where the configuration interface manager 220 in the electronic device 135-1 adds the received server tools 154-1 to the device tools 215 or updates the device tools 215 with the received server tools 154-1 if the server tools 154-1 were received. Control then continues to block 1335 where the configuration interface manager 220 in the electronic device 135-1 adds the policy steps 158-1 to the device steps 210 and/or replaces the existing device steps 210 with the received policy steps 158 if the policy steps 158-1 were received.

Control then continues to block 1340 where the configuration interface manager 220 in the electronic device 135-1 adds the received specification of a network address or network addresses to the network address field 1020 in the steps command 230 and the step complete command 235. In this way, the server computer system 100-1 may change the address in the network 130 to which the steps command and the steps complete command are sent. In various embodiments, the server computer system 100-1 may change the network address field 1020 to indicate a broadcast command, a command to a single specified address, or a command to group of addresses. Control then continues to block 1399 where the logic of FIG. 13 returns.

Figure 14:
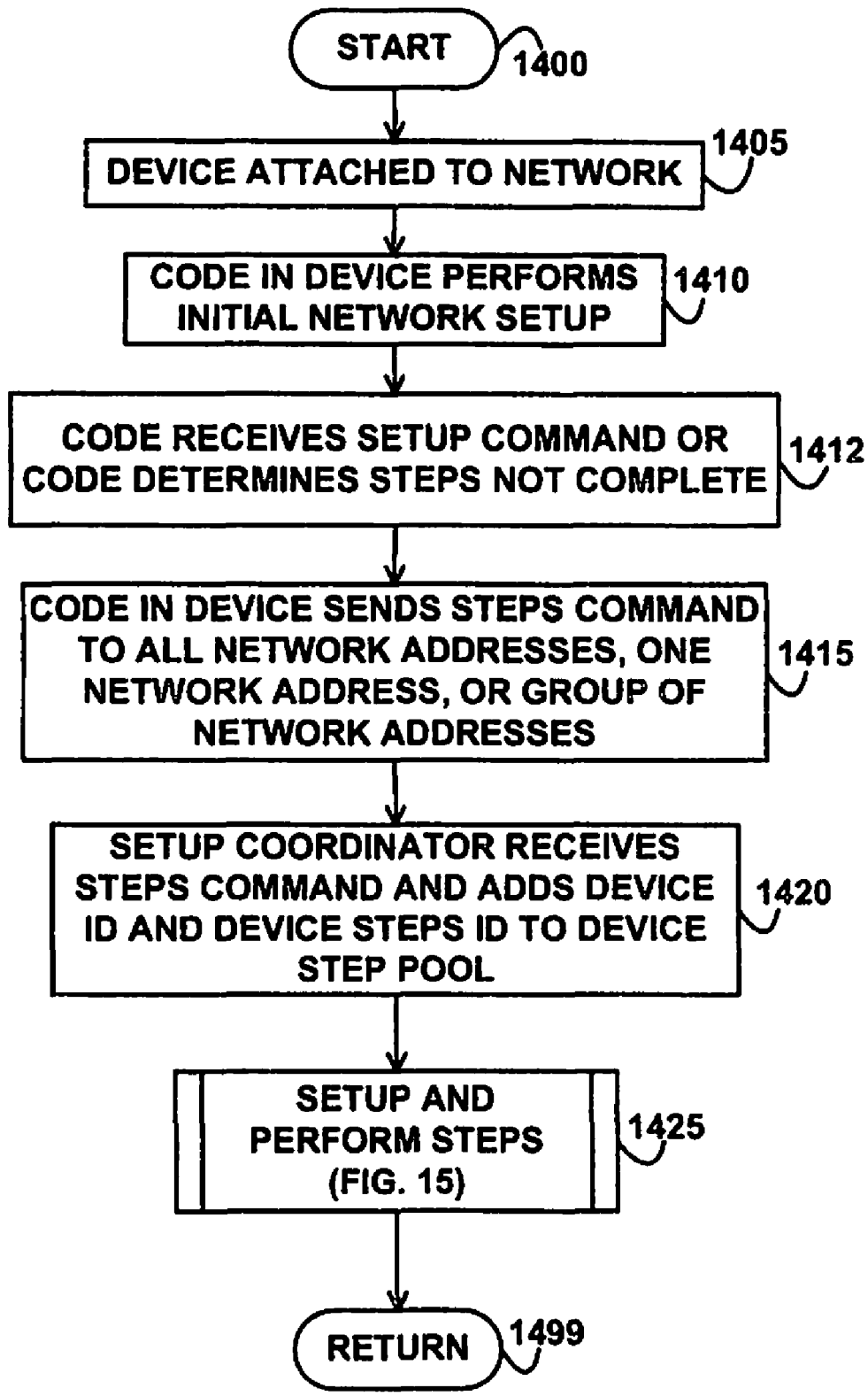
FIG. 14 depicts a flowchart of example processing for installing a device at a network, according to an embodiment of the invention.

FIG. 14 depicts a flowchart of example processing for installing an electronic device at a network, according to an embodiment of the invention. The logic of FIG. 14 may be executed for each electronic device 135 that is attached to the network 130. Thus, an embodiment of the invention coordinates the installation and configuration steps for multiple electronic devices, and the multiple electronic devices may perform different steps within their own respective step sequence order.

Control begins at block 1400. Control then continues to block 1405 where the code 225 determines that the current electronic device is connected to the network 130. Control then continues to block 1410 where the code 225 in the current electronic device performs initial network set up, which allows the electronic device to communicate with the network 130 if the initial network set up has not already occurred. In an embodiment, the code 225 may perform the initial network setup in response to determining that the connection of the electronic device to the network occurred for the first time. In another embodiment, the code 225 may perform the initial network setup in response to a command received from a user interface of the electronic device 135, such as a setup wizard or a command received from selection of a button or switch mounted on the electronic device 135.

Control then continues to block 1412 where the code 225 receives a setup command or determines that the device steps 210 are not complete. In an embodiment, the code 225 may receive a setup command from a user interface of the electronic device, such as an initial setup wizard, a menu option, a button or switch mounted on the electronic device. In another embodiment, the code 225 may receive the setup command in response to the completion of the initial network setup or attachment/connection of the electronic device to the network 130. In another embodiment, the code 225 may determine that the device steps have not yet been completed.

Control then continues to block 1415 where the code 225 in the current electronic device sends the steps command to all network addresses in the network as a broadcast command, sends the steps command 230 to one assigned address in the network 130, or sends the steps command 230 to a group of addresses in the network 130. In various embodiments, the code 225 sends the steps command 230 in response to the device attaching to the network 130, in response to the completion of the initial network setup, in response to the setup command, or in response to determining that the steps in the device steps are not all complete.

The steps command 230 may include all of the steps in the device steps 210 that have not yet been completed. In an embodiment, the steps in the device steps 210 have been modified or have been added to, as previously described above with reference to FIG. 13. In another embodiment, the device steps 210 have not been altered since they were initially stored in the electronic device 135, e.g., at the time of manufacture of the electronic device, at the time of testing the electronic device, at the time of shipping or distributing the electronic device 135, or at any other appropriate time.

Control then continues to block 1420 where the setup coordinator 150-2 in the server computer system 100-2 receives the steps command 230, adds the device identifier 1005 for the current electronic device that sent the steps command 230 into the device step pool 156, and adds the device steps identifier for the received steps into the device step pool 156. Control then continues to block 1425 where the steps are set up and performed, as further described below with reference to FIG. 15. Control then continues to block 1499 where the logic of FIG. 14 returns.

Figure 15:
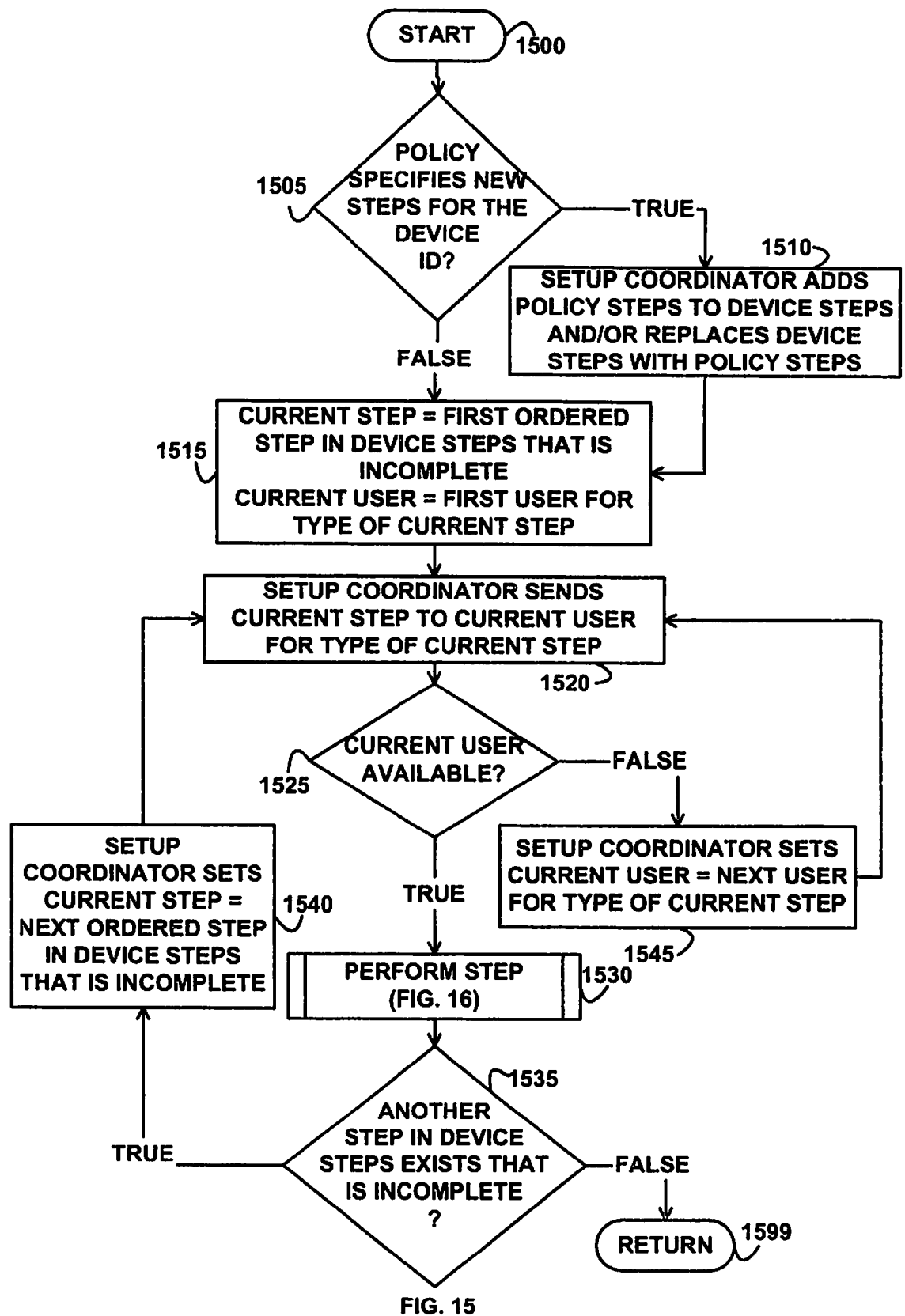
FIG. 15 depicts a flowchart of example processing for selecting experts and steps, according to an embodiment of the invention.

FIG. 15 depicts a flowchart of example processing for selecting experts and steps, according to an embodiment of the invention. Control begins at block 1500. Control then continues to block 1505 where the setup coordinator 150 determines whether the policy steps 158 specifies new steps for the current device identifier that is specified in the steps command 230. If the determination at block 1505 is true, then the policy steps 158 specifies new steps for the device identifier, so control continues to block 1510 where the setup coordinator 150 adds the new policy steps 158 to the received device steps and/or replaces the received device steps with the policy steps 158.

Control then continues to block 1515 where the setup coordinator 150 sets the current step for the current electronic device to be the first ordered step in the received device steps that is not complete for the current electronic device. The setup coordinator 150 further sets the current user to be first user that is assigned to the type of the current step (the current user 930 that is assigned to the expert type 925 that matches the expert type 545 in the current step).

Control then continues to block 1520 where the setup coordinator 150 sends the current step for the current electronic device to the current user that is assigned to the type of the current step. Control then continues to block 1525 where the setup coordinator 150 determines whether the current user is available. The current user is available if the setup coordinator 150 has received an acknowledgment in response to the sending of the current step (previously sent at block 1520).

If the determination at block 1525 is true, then the current user has received and acknowledged the current step, so the current user is available, so control continues to block 1530 where the current step is performed., as further described below with reference to FIG. 16. Control then continues to block 1535 where the setup coordinator 150 determines whether a next step within the order 525 of the steps in the device steps 210 exists and the step complete field 550 indicates that the step is not complete.

If the determination at block 1535 is true, then the next step in the order of the steps in the device steps 210 does exist and is incomplete, so control continues to block 1540 where the setup coordinator 150 sets the current step to be the next step within the order of the steps in the device steps that is incomplete. The setup coordinator 150 further sets the current user to be the first user that is assigned to the expert type of the current step. Control then returns to block 1520 where the setup coordinator 150 sends the new current step to the current user, as previously described above.

If the determination at block 1535 is false, then another incomplete step for the electronic device does not exist, and all of the steps for the device have been completed, and the electronic device is now configured for productive use in the network 130, so control continues to block 1599 where the logic of FIG. 15 returns.

If the determination of block 1525 is false, then the current user specified in the expert list that is assigned to the expert type of the current step is not available, and the current user has not sent an acknowledgment to the sending of the current step, so control continues to block 1545 where the setup coordinator 150 sets the current user to be the next user that is associated with or assigned to the expert type of the current step in the expert list 152. If no more users are specified in expert list with expert types 925 that match the expert types 545, then the setup coordinator 150 may wait for an acknowledgment or wrap the assignment of the current user back to the first user. Control then returns to block 1520 where the setup coordinator 150 sends the current step to the new current user, as previously described above.

If the determination at block 1505 is false, then the policy steps do not specify new steps for the current electronic device identified by the device identifier in the steps command 230, so control continues to block 1515, as previously described above.

Figure 16:
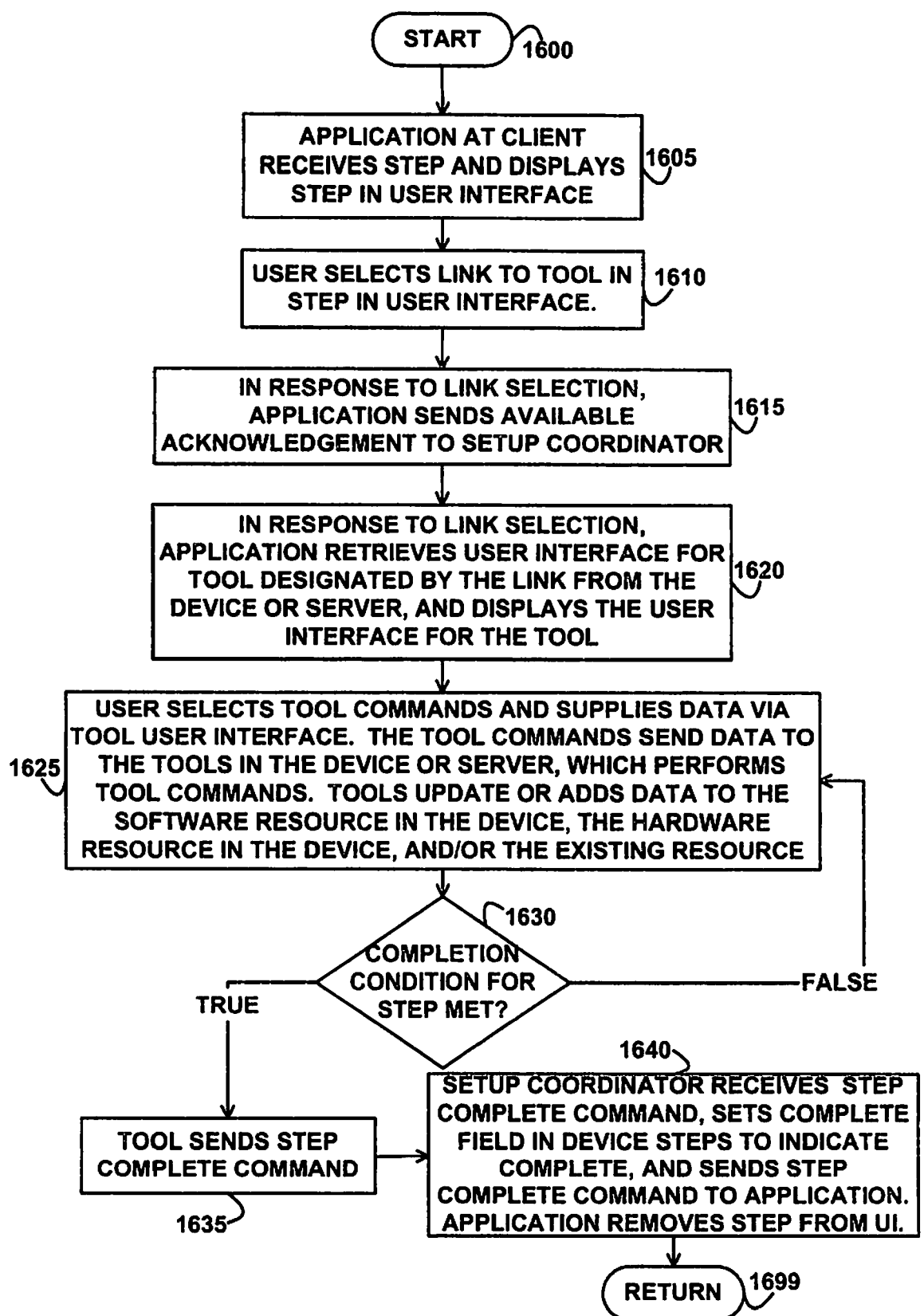
FIG. 16 depicts a flowchart of example processing for performing steps, according to an embodiment of the invention.

FIG. 16 depicts a flowchart of example processing for performing steps, according to an embodiment of the invention. Control begins at block 1600. Control then continues to block 1605 where the application 190 at the client computer system 132 receives a step and displays the step in the user interface 400 via the terminal 121. Control then continues to block 1610 where the user selects a link 410 in a step that points at a tool (such as a device tool 215 or a server tool 154) via the user interface 400 and the user terminal 121.

Control then continues to block 1615 where the application 190, in response to the selection of the link (e.g., the link 425), sends an acknowledgment to the setup coordinator 150, which indicates that the user is available. (This acknowledgment is received and checked at block 1525, as previously described above with reference to FIG. 15.)

Control then continues to block 1620 where the application 190, in response to the link selection, sends the link, or portions of the link, such as the directory, subdirectories, and filename, to the network address, domain, and/or port specified by the link, using the protocol specified by the link, if any, and receives the user interface 435, including the tool commands 436, from the electronic device 135 or server computer system 100 (which send the user interface 435) identified by the link. The user interface 435 may be retrieved, for example, by retrieving a page via the link. The application 190 further displays the user interface 435 for the tool, including the tool commands 436, via the user terminal 121.

Control then continues to block 1625 where the user selects one or more of the tool commands 436 from the tool user interface 435 and supplies data to the tool commands via the tool user interface 435 and the user terminal 121. The tool commands 436 send the received data and a specification of the selected tool command to the device tools 215 in the electronic device 135 or server tools 154-2 in the server computer system 100, which performs the tool commands. The tools may update or add the data to the software resource 240 and/or the hardware resource 205 in the electronic device 135, and/or the existing resource 315. The tool may further retrieve data from the software resource 240 and/or hardware resource 205 in the electronic device 135 and/or the existing resource 315. The tool may further send data to the expert user via the user interface 400. For example, if the tool command reads the storage capacity of the electronic device 135, the speed of electronic device 135, or the protocols that the electronic device 135 supports, the tool may then return data that describes the storage capacity, the speed, or the protocols, to the user via the user interface 400 and the user terminal 121.

Control then continues to block 1630 where the tool determines whether the completion condition 540 for the current step is met or satisfied. If the determination at block 1630 is true, then the completion condition 540 for the current step has been met, and the current step is completed or done, so control continues to block 1635 where the tool sends the step complete command 235, which in various embodiments may be broadcast to all network addresses, or sent to a specific network address or group of addresses. The step complete command 235 indicates that the current step has been completed. Control then continues to block 1640 where the setup coordinator 150 receives the step complete command 235 and sets the step complete field 550 in the device steps 210 for the current step to indicate that the current step is complete. The setup coordinator 150 further sends the step complete command 235 to the application 190 of the current user who processed the step (who selected the tool command that caused the step to complete). The application 190 receives the step complete command 235, and in response, removes the completed step from the user interface 400. Control then continues to block 1699 where the logic of FIG. 16 returns.

If the determination of block 1630 is false, then that the completion condition 540 for the current step is not met, and a further tool command needs to be performed, in order to complete the step, so control returns to block 1625 where the user once again selects one or more tool commands 436 and supplies data via the tool user interface. The data that the user supplies to the current tool command, may be based on data that the user received from previous tool commands.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   determining, at an electronic device that the electronic device is connected to a network, wherein the electronic device is encoded with a plurality of steps and a step command, and wherein each of the steps comprises a respective type and a respective link that points at a respective tool encoded in the electronic device, wherein the plurality of steps have an order of performance, and wherein the step command comprises an address of a setup coordinator in the network;
   in response to the determining that the electronic device is connected to the network, sending from the electronic device the plurality of steps to the address in the network, wherein the setup coordinator, as long as the performance of at least one of the plurality of steps is incomplete, selects a current one of the plurality of steps in the order that is incomplete, selects a respective user that is assigned to the respective type of the current one of the plurality of steps, and sends the respective link to the respective user;
   receiving, at the electronic device, a selection of one of the respective links from the respective user;
   in response to the receiving, sending, from the electronic device, a respective user interface for the respective tool to the respective user, wherein the user interface comprises a specification of a tool command;
   receiving, at the electronic device, the tool command and data from the respective user; and
   performing, by the respective tool at the electronic device, the tool command, wherein the performing the tool command further comprises storing the data to the electronic device and modifying configuration data that describes a hardware resource at the electronic device.

2. The method of claim 1, wherein the sending the plurality of steps further comprises:
   sending a broadcast command to all addresses in the network, wherein the broadcast command comprises the plurality of steps.

3. The method of claim 1, wherein each of the steps further comprises a respective completion condition, and wherein the method further comprises:
   if the performing the tool command causes the respective completion condition for the respective step to be met, sending a completion command for the respective step to the address in the network.

4. The method of claim 3, wherein the sending the completion command further comprises:
   sending a broadcast command to all addresses in the network, wherein the broadcast command comprises the completion command.

5. The method of claim 1, further comprising:
   receiving a new step via the network;
   and adding the new step to the plurality of steps.

6. The method of claim 1, further comprising:
   receiving a new step via the network; and
   replacing one of the plurality of steps with the new step.

7. A method for deploying computing services, comprising:
   integrating computer readable code into an electronic device, wherein the code in combination with the device performs the method of claim 1.

8. A non-transitory computer-readable storage medium encoded with instructions, wherein the instructions when executed comprise:
   determining, at an electronic device that the electronic device is connected to a network, wherein the electronic device is encoded with a plurality of steps and a step command, and wherein each of the steps compromise a respective type and a respective link that points at a respective tool encoded in the electronic device, wherein the plurality of steps have an order of performance, and wherein the step command comprises an address of a setup coordinator in the network;
   in response to the determining that the electronic device is connected to the network, sending from the electronic device the plurality of steps to the address in the network, wherein the setup coordinator, as long as the performance of at least one of the plurality of steps is incomplete, selects a current one of the plurality of steps in the order that is incomplete, selects a respective user that is assigned to the respective type of the current one of the plurality of steps, and sends the respective link to the respective user;
   receiving, at the electronic device, a selection of one of the respective links from the respective user;
   in response to the receiving, sending, from the electronic device, a respective user interface for the respective tool to the respective user, wherein the user interface comprises a specification of a tool command;
   receiving, at the electronic device, the tool command and data from the respective user; and
   performing, by the respective tool at the electronic device, the tool command, wherein the performing the tool command further comprises storing the data to the electronic device and modifying configuration data that describes a hardware resource at the electronic device.

9. The non-transitory computer-readable storage medium of claim 8, wherein the setup coordinator:
   determining whether the respective user is available; and
   if the respective user is not available, selecting a next user that is assigned to the respective type, and sending the respective link to the next user.

10. The non-transitory computer-readable storage medium of claim 8, wherein the setup coordinator:

receiving a completion command from the respective tool, wherein the completion command comprises an identifier of the current one of the steps; and in response to the receipt of the completion command, identifies the current one of the steps as complete and moves to a next one of the steps in the order that is incomplete.

11. The non-transitory computer-readable storage medium of claim 8, further comprising:

determining if a new step exists; and if the new step exists, adding the new step to the plurality of steps.

12. The non-transitory computer-readable storage medium of claim 8, further comprising:

determining if a new step exists; and if the new step exists, replacing one of the plurality of steps with the new step.

13. A computer system comprising:

a processor; and memory connected to the processor, wherein the memory encodes instructions that when executed by the processor comprise:

determining, at an electronic device that the electronic device is connected to a network, wherein the electronic device is encoded with a plurality of steps and a step command, and wherein each of the steps compromise a respective type and a respective link that points at a respective tool encoded in the electronic device, wherein the plurality of steps have an order of performance, and wherein the step command comprises an address of a setup coordinator in the network;

in response to the determining that the electronic device is connected to the network, sending from the electronic device the plurality of steps to the address in the network, wherein the setup coordinator, as long as the performance of at least one of the plurality of steps is incomplete, selects a current one of the plurality of steps in the order that is incomplete, selects a respective user that is assigned to the respective type of the current one of the plurality of steps, and sends the respective link to the respective user;

receiving, at the electronic device, a selection of one of the respective links from the respective user;

in response to the receiving, sending, from the electronic device, a respective user interface for the respective tool to the respective user, wherein the user interface comprises a specification of a tool command;

receiving, at the electronic device, the tool command and data from the respective user; and performing, by the respective tool at the electronic device, the tool command, wherein the performing the tool command further comprises storing the data to the electronic device and modifying configuration data that describes a hardware resource at the electronic device.

14. The computer system of claim 13, wherein the instructions further comprise:

in response to a selection of the tool command and submission of data by the user, sending the tool command and the data to the respective tool.

15. The computer system of claim 13, wherein the setup coordinator:

receiving a completion command from the respective tool, wherein the completion command comprises an identifier of the current one of the steps; and in response to the receiving the completion command, identifying the current one of the steps as complete and moves to a next one of the steps in the order that is incomplete.

16. The computer system of claim 13, wherein the instructions further comprise:

determining whether a new step exists; and if the new step exists, adding the new step to the plurality of steps.

17. The computer system of claim 13, wherein the instructions further comprise:

determining whether a new step exists; and if the new step exists, replacing one of the plurality of steps with the new step.

18. The electronic device of claim 13, wherein each of the steps further comprises a respective completion condition, and wherein the setup coordinator further:

sending the respective link and the completion condition to the user.

* * * * *